US008824554B2

United States Patent
Shi et al.

(10) Patent No.: US 8,824,554 B2
(45) Date of Patent: *Sep. 2, 2014

(54) SYSTEMS AND METHODS FOR VIDEO CONTENT ANALYSIS

(75) Inventors: Fang Shi, San Diego, CA (US); Jin Ming, ChengDu (CN); Qi Wu, Chengdu (CN); Fan You, San Diego, CA (US); Kai Bao, Torrance, CA (US)

(73) Assignee: Intersil Americas LLC, Milpitas, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/225,269

(22) Filed: Sep. 2, 2011

(65) Prior Publication Data

US 2012/0057634 A1    Mar. 8, 2012

(51) Int. Cl.
*H04N 7/12* (2006.01)
*H04N 7/50* (2006.01)
*H04N 7/26* (2006.01)
*H04N 5/14* (2006.01)

(52) U.S. Cl.
CPC .......... *H04N 7/50* (2013.01); *H04N 7/26244* (2013.01); *H04N 5/145* (2013.01); *H04N 7/26765* (2013.01); *H04N 19/00381* (2013.01); *H04N 19/00236* (2013.01); *H04N 19/0009* (2013.01); *H04N 19/0006* (2013.01); *H04N 19/00278* (2013.01)
USPC ........... 375/240.16; 375/240.01; 375/240.15; 375/240.17; 375/240.18; 375/240.19

(58) Field of Classification Search
CPC .......... H04N 19/00381; H04N 19/00236; H04N 19/0009; H04N 19/0006; H04N 19/00278; H04N 7/50; H04N 7/26244; H04N 5/145; H04N 7/26765; H04N 7/26015

USPC ..................................... 375/240.16
See application file for complete search history.

(56) References Cited

U.S. PATENT DOCUMENTS 5,128,754 A * 7/1992 Dhein ............... 375/240.11
7,460,601 B2   12/2008 Taniguchi (Continued)

FOREIGN PATENT DOCUMENTS

CN    101014128    8/2007
CN    101043633    9/2007

(Continued)

OTHER PUBLICATIONS

TW5864B1, 5D1 H264 Encoder with 4-Channel A/V Decoder & 12 Channel External VD Inputs for Security Applications, Dec. 14, 2011.*

(Continued)

*Primary Examiner* — Andy Rao
*Assistant Examiner* — Shan Elahi
(74) *Attorney, Agent, or Firm* — Anthony G. Smyth; Loza & Loza, LLP

(57) ABSTRACT

Video analytics systems and methods are described that typically comprise a video encoder operable to generate macroblock video analytics metadata (VAMD) from a video frame. Functional modules receive the VAMD and an encoded version of the video frame is configured to generate video analytics information related to the frame using the VAMD and the encoded video frame. The downstream decoder can use the VAMD to obtain a global motion vector related to the frame, detect and track motion of an object within the frame and monitor a line provided or found within the frame. Traversals of the line by a moving object can be detected and counted using information in the VAMD and the line may be part of a polygon that delineates an area to be monitored within the encoded frame. The VAMD can comprise macroblock level and video frame level information.

20 Claims, 2 Drawing Sheets

(56) References Cited

U.S. PATENT DOCUMENTS

| | | | |
|---|---|---|---|
| 7,532,808 B2 | 5/2009 | Lainema | |
| 7,672,370 B1* | 3/2010 | Russell et al. | 375/240.01 |
| 7,936,372 B2 | 5/2011 | Murakami et al. | |
| 2003/0056511 A1* | 3/2003 | Bruck et al. | 60/723 |
| 2003/0156648 A1* | 8/2003 | Holcomb et al. | 375/240.18 |
| 2004/0170330 A1* | 9/2004 | Fogg | 382/232 |
| 2004/0196908 A1* | 10/2004 | Lin et al. | 375/240.15 |
| 2005/0047504 A1* | 3/2005 | Sung et al. | 375/240.2 |
| 2005/0053295 A1* | 3/2005 | Holcomb | 382/236 |
| 2005/0203927 A1* | 9/2005 | Sull et al. | 707/100 |
| 2006/0062478 A1* | 3/2006 | Cetin et al. | 382/232 |
| 2006/0078051 A1* | 4/2006 | Liang et al. | 375/240.24 |
| 2006/0114989 A1 | 6/2006 | Panda | |
| 2007/0074266 A1* | 3/2007 | Raveendran et al. | 725/135 |
| 2007/0237221 A1 | 10/2007 | Hsu et al. | |
| 2008/0049834 A1* | 2/2008 | Holcomb et al. | 375/240.2 |
| 2008/0069211 A1 | 3/2008 | Kim et al. | |
| 2008/0074496 A1* | 3/2008 | Venetianer et al. | 348/150 |
| 2009/0015671 A1* | 1/2009 | Addy | 348/143 |
| 2009/0031381 A1* | 1/2009 | Cohen et al. | 725/115 |
| 2009/0079867 A1* | 3/2009 | Leone et al. | 348/453 |
| 2009/0219387 A1* | 9/2009 | Marman et al. | 348/143 |
| 2009/0219639 A1* | 9/2009 | Marman et al. | 360/69 |
| 2010/0150233 A1 | 6/2010 | Kim et al. | |
| 2010/0215104 A1* | 8/2010 | Osamoto et al. | 375/240.16 |
| 2010/0290530 A1* | 11/2010 | Huang et al. | 375/240.16 |
| 2011/0103468 A1* | 5/2011 | Polisetty et al. | 375/240.03 |
| 2011/0157178 A1* | 6/2011 | Tuzel et al. | 345/426 |

FOREIGN PATENT DOCUMENTS

| | | |
|---|---|---|
| CN | 101090498 | 12/2007 |
| CN | 101179729 | 5/2008 |
| CN | 101389023 | 3/2009 |
| CN | 101389029 | 3/2009 |
| CN | 101448145 | 6/2009 |
| JP | 2010128727 A * | 6/2010 |
| WO | 2008046243 | 4/2008 |

OTHER PUBLICATIONS

He et al, Video Compression and Data Flow for Video Surveillance, Sep. 2007.*

IP-Surveillance design guide, Setting up an IP-Surveillance system using Axis network cameras, video encoders and AXIS Camera Station software, Jul. 25, 2008.*

JP2010128727MT, Fuji Miyuki, Oct. 6, 2010, (note that it is an english translation of the JP 2010128727 and it was download from JP websites).*

Patent Cooperation Treaty, International Search Report and the Written Opinion of the International Searching Authority for PCT/CN2010/076555, Jun. 9, 2011, pp. 1-11.

Patent Cooperation Treaty, International Search Report and the Written Opinion of the International Searching Authority for PCT/CN2010/076564, Jun. 9, 2011, pp. 1-11.

Patent Cooperation Treaty, International Search Report and the Written Opinion of the International Searching Authority for PCT/CN2010/076567, Jun. 9, 2011, pp. 1-12.

Patent Cooperation Treaty, International Search Report and the Written Opinion of the International Searching Authority for PCT/CN2010/076569, May 12, 2011, pp. 1-10.

* cited by examiner

SYSTEMS AND METHODS FOR VIDEO CONTENT ANALYSIS

CROSS-REFERENCE TO RELATED APPLICATIONS

The present Application claims priority from PCT/CN2010/076567 (title: "Systems And Methods for Video Content Analysis") which was filed in the Chinese Receiving Office on Sep. 2, 2010, from PCT/CN2010/076569 (title: "Video Classification Systems and Methods ") which was filed in the Chinese Receiving Office on Sep. 2, 2010, from PCT/CN2010/076564 (title: "Rho-Domain Metrics") which was filed in the Chinese Receiving Office on Sep. 2, 2010, and from PCT/CN2010/076555 (title: "Video Analytics for Security Systems and Methods") which was filed in the Chinese Receiving Office on Sep. 2, 2010, each of these applications being hereby incorporated herein by reference. The present Application is also related to concurrently filed U.S. patent application Ser. No. 13/225,202 entitled "Video Classification Systems and Methods", U.S. patent application Ser. No. 13/225,222 entitled "Rho-Domain Metrics", and U.S. patent application Ser. No. 13/225,238 entitled "Video Analytics for Security Systems and Methods", which are expressly incorporated by reference herein.

DETAILED DESCRIPTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the disclosed embodiments will be described, and detailed descriptions of other portions of such known components will be omitted so as not to obscure the disclosed embodiments. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, certain embodiments of the present invention encompass present and future known equivalents to the components referred to herein by way of illustration.

Certain embodiments of the invention provide systems and methods for video content analysis, which is also known as video analytics. Video analytics can facilitate the analysis of video and enables the detection and determination of temporal events that are not based on, or limited to, a single image. Video analytics can be used in a wide range of domains including entertainment, health care, retail, automotive, transport, home automation (domotics), safety and security. Algorithms associated with video analytics can be implemented as software in a variety of computing platforms, including general purpose machines, mobile computing devices, smart phones, gaming devices, embedded systems and/or in hardware used in specialized video processing units. According to certain aspects of the invention, combinations of hardware and software can be used in video analytics systems to improve video analytics accuracy, speed and extendibility.

Figure 1:
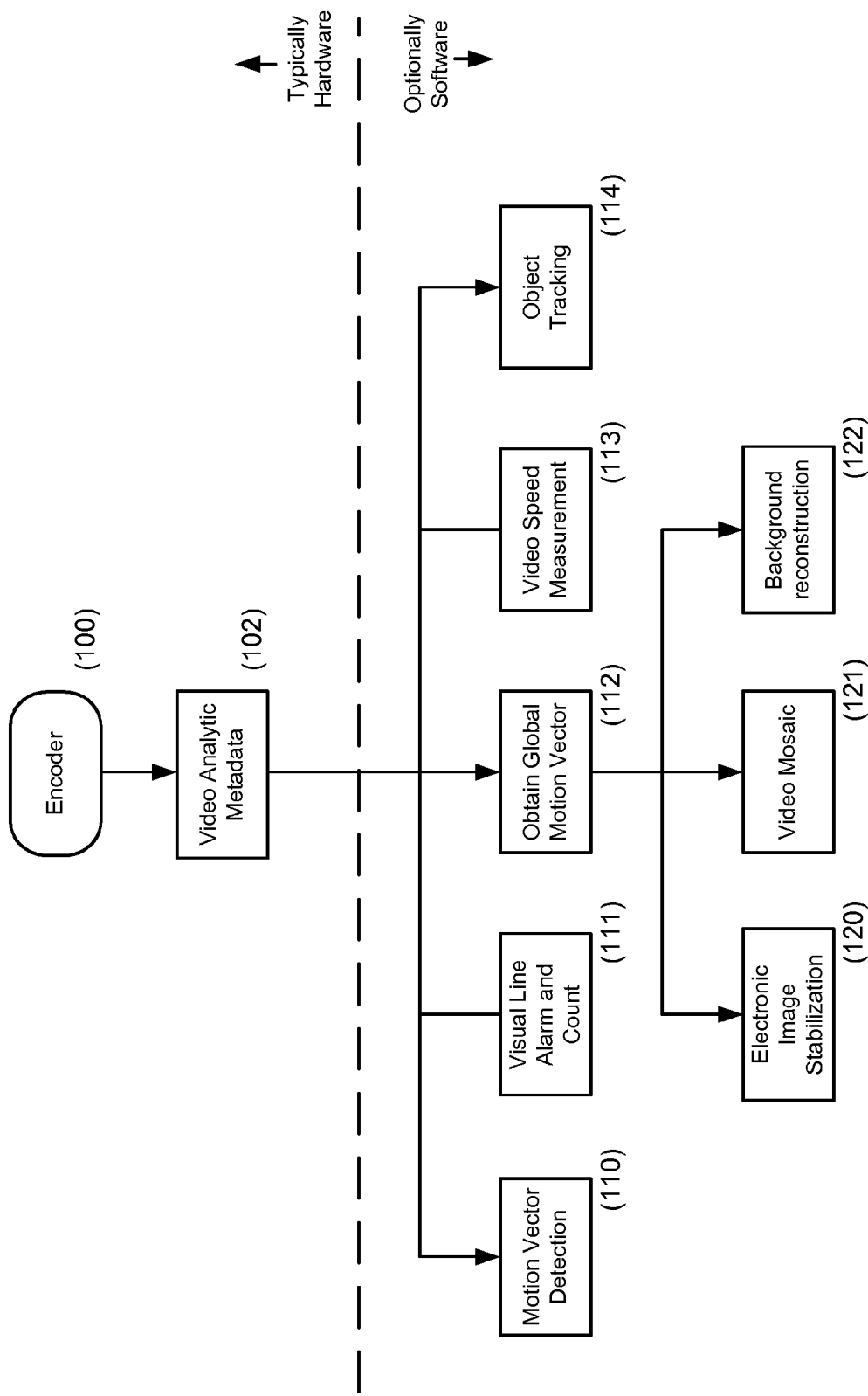
FIG. 1 is a diagram illustrating a system architecture describing according to certain aspects of the invention.
Figure 2:
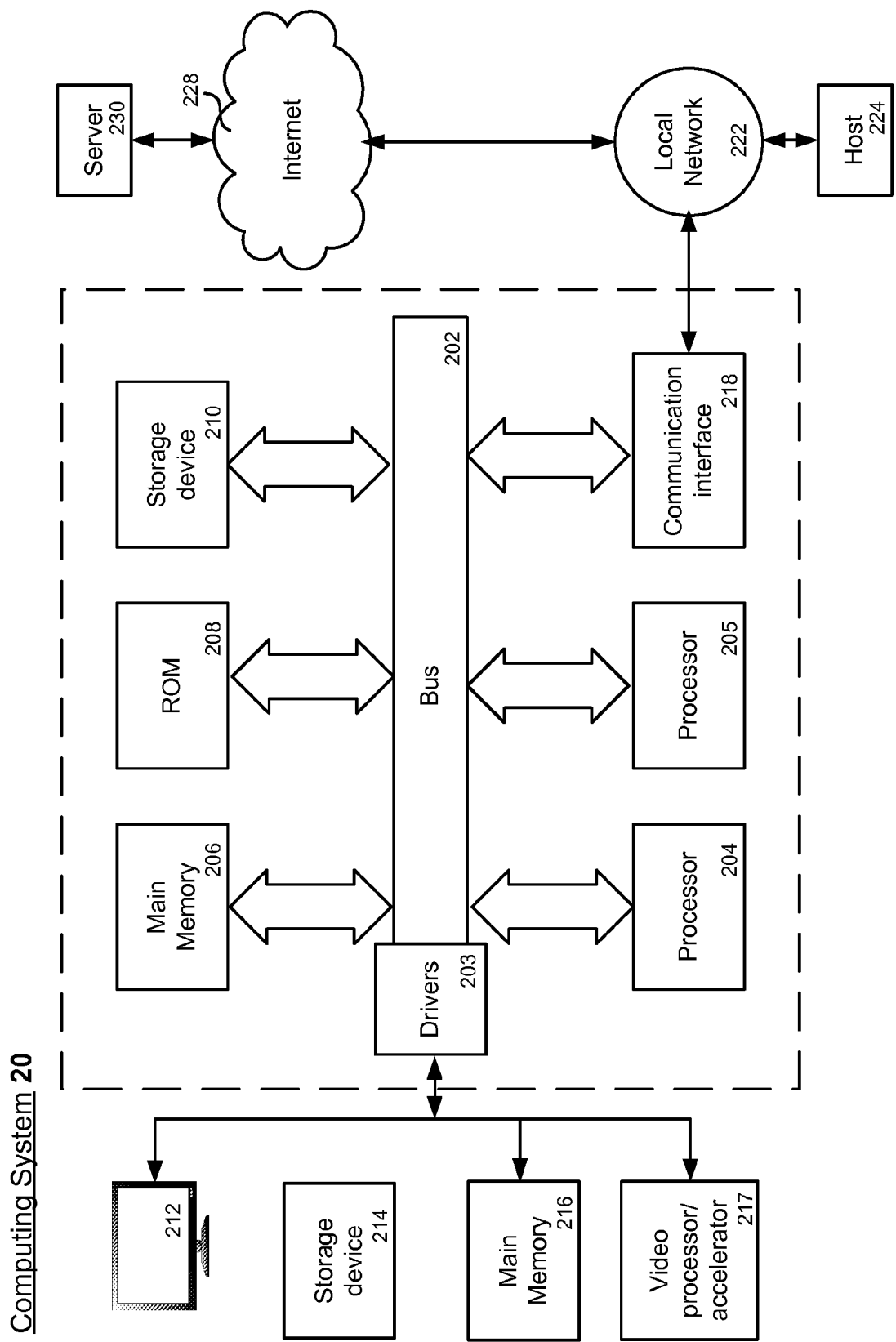
FIG. 2 is a simplified block schematic illustrating a processing system employed in certain embodiments of the invention.

FIG. 1 is a schematic showing a simplified example of a system architecture that can be used to perform certain video analytics functions. In the example, video encoder 100 performs macroblock ("MB") based video encoding processes. Encoder 100 is typically provided in hardware, such as a camera, digital video recorder, etc., and can comprise processors, non-transitory storage and other components as described in more detail herein in relation to FIG. 2. Video encoder 100 may comprise an adaptable and/or configurable commercially available hardware encoding chip such as the TW5864 marketed by Intersil Techwell. According to certain aspects of the invention, video encoder 100 is adapted and/or configured to generate a package of video analytics metadata 102 (VAMD) for each MB processed. VAMD 102 may comprise a count of non-zero coefficients, MB type, motion vector, selected DC/AC coefficients after discrete cosine transform ("DCT transform"), a sum of absolute differences (SAD) value after motion estimation for each MB, and so on. Video encoder 100 may provide video frame level information in VAMD 102. At the frame level, VAMD 102 can include an A/D Motion Flag, a block based motion indicator generated in an A/D video front end, etc. VAMD 102 can be stored and/or aggregated in storage that can maintained by the video encoder 100 or another processing device.

VAMD 102 can be transmitted by hardware encoding module (video encoder 100), or another processor communicatively coupled to the encoding module 100, to one or more processing modules 110-114 for further video analytics processing. Further processing may be performed using any suitable combination of hardware and software components. While FIG. 1 depicts processing modules 110-114 as embodied in software components, it is contemplated that certain advantages may be obtained in embodiments that embody at least a portion of processing modules 110-114 in hardware; such hardware can include sequencers, controllers, custom logic devices, and customizable devices that can include one or more embedded processors and/or digital signal processors. Advantages of embedding portions of processing modules 110-114 in hardware include accelerated processing, application specific optimizations, enhanced cost and size efficiencies, improved security and greater reliability. In the depicted example, video analytics processing includes hardware/software combinations for motion detection, visual line detection, virtual counting, motion tracking, motion based object segmentation, etc.

In certain embodiments, a global motion vector processor 112 can be generated from VAMD 102. Global motion vectors can be used for electronic image stabilization 120, video mosaic 121, background reconstruction 122, etc. Other processors may extract information from VAMD 102, including processors for detecting motion vectors 110, counting visual lines and generating alarms related to visual lines 111, measuring speed of objects using video 113 and tracking motion of objects 114.

Accordingly, certain embodiments of the invention provide co-existing video analytics systems in which VAMD 102 functions as a common interface. VAMD 102 can include both frame-level information, such as ADMotionflag, and MB-level information, such as motion vector, MB-type, etc., to efficiently assist processing modules for video security analytics applications.

Systems and methods according to certain aspects of the invention can provide significant advantages over conventional pixel domain video analytics algorithms. For example, certain embodiments require less memory bandwidth than conventional systems. Conventional video analytics algorithms generally use pixel domain based techniques that operate at the pixel level that require large quantities of memory for processing. For example, to process a standard television (D1 resolution) video, 704×576 bytes of memory bandwidth (405,504 bytes) is required to process each PAL frame (or 704×480 for an NTSC frame), even where only luma information is needed. However, in certain embodiments of the present invention, most of the VAMD is MB based—depending on the video analytics algorithms of interest—and there are only $$\frac{704 \times 576}{256} = 1,584$$

only bytes, where each MB is 16×16 pixels. Consequently, the present invention requires orders of magnitude less memory bandwidth for the same video analytics function. The memory bandwidth savings can dramatically increase the number of channels to be processed for VA.

Certain embodiments provide systems and methods for implementing a low cost video analytics systems using VAMD 102 created during video compression. When video is pre-processed with video compression, such as H-264 encoding, the VAMD 102 may be obtained as a by-product of front-end video compression (encoding). The cost of deriving VAMD 102 during compression can be very low, and the availability of the VAMD 102 derived in this manner may be very valuable when used with certain analytic functions. For example, a number of video analytics algorithms require motion information to detect and track motion objects. Performing motion estimation to obtain the local motion vectors can comprise very computationally complicated processes. In certain embodiments of the present invention, a video encoder can generate motion vectors in sub-pixel granularity for each 4×4 or 8×8 blocks based on the applicable video standard, and certain filtering operations can be applied to the local motion vectors to generate one motion vector per MB as part of the VAMD 102.

Certain embodiments of the invention yield improved software video analytics efficiencies. For example, in software video analytics modules 110-114, motion vectors provided in VAMD 102 can be extracted and used instead of calculating motion vectors from a video feed. Certain advanced filtering operations may be applied to generate the desired motion information to facilitate motion detection, virtual line alarm and counting. This permits the application of the processor to more advanced analytic functions instead of collecting primitive motion data. Moreover, certain of the motion detection processing can more easily be performed using configurable hardware systems such as ASICs, PLDs, PGAs, FPGAs, sequencers and controllers. In addition, operating on motion vector per MB can greatly improve video analytics efficiency, enabling more advanced algorithms and video analytics for multiple channels simultaneously.

Certain embodiments of the invention collect specific VAMD 102 information to improve video analytics efficiency and accuracy in comparison to conventional motion vector ("MV") assisted approaches. Certain embodiments can improve video analytics accuracy by augmenting motion vector per MB and mode decision sum of absolute differences ("SAD") information extracted by a hardware encoding module. A restriction to MV and SAD information has certain disadvantages, including in P-frames, for example, where the edges of newly appearing objects are usually encoded as an I-type MB with zero value motion vector and uncertain SAD value, and where background MB has both zero motion vector and very small SAD values. Using MV and SAD only, it can be difficult to distinguish a new moving object from the background. In certain embodiments of the present invention, VAMD 102 comprises MV information and non-zero-coefficient (NZ), MB-type and other DC/AC information, allowing newly appearing objects to be distinguished from the background by checking MB-type, MV and non-zero coefficient ("NZ") information. Furthermore, most video content has some background noise, which is known to produce irregular motion vector and SAD for motion estimation algorithms. Using NZ and DC values from VAMD 102, noise reduction for video analytics algorithms can be achieved.

Certain embodiments of the invention facilitate the use of advanced video analytics algorithms, balancing of transmission bandwidth and increased computational complexity. Some video analytics algorithms, such as motion based object segmentation, motion object tracking and global motion estimation require more information than provided by MV and SAD. Certain embodiments of the present invention provide additional information in a customizable and configurable format. Users can determine which information is packed into VAMD to balance transmission bandwidth and to support increased software computational complexity through partitioning of functionality between hardware and software modules.

Algorithm Comparisons

Certain embodiments of the invention can improve memory and transmission bandwidth utilization. Conventional video analytics algorithms utilize pixel domain techniques. Generally, 704×576 bytes per frame of data would be needed to transmit from encoding module to analytics module for D1 resolution standard video application. This bandwidth requirement often limits video analytics devices to processing only one channel at a time, increasing the cost of product. In one example embodiment of the present invention, using the above described TW5864 device, 4-bytes of VAMD per MB is generated from the encoding module yielding the equivalent of 1/64 of the total memory bandwidth that would be needed to process D1 video in a conventional system. The reduced bandwidth requirement enables embodiments of the current invention to simultaneously process 16 channels for video analytics, which would be present a difficult obstacle to pixel domain implementations.

Certain embodiments of the invention improve motion detection accuracy. Motion detection employs algorithms to automatically detect moving objects, such as humans, animals or vehicles entering into a predefined alarm region. Issues with conventional systems include pixel domain algorithm difficulties in handling changing of light conditions. Under fluorescent lamps or in dim light environments, background pixel values can vary dramatically and, without the benefit of motion, NZ or DC information, pixel domain algorithms generally have large false alarm ratios.

Systems that use an algorithm that responds only to MV and SAD information generally also have serious issues. Newly appearing objects in a P-frame are usually encoded as I-type MB with zero motion vector and may also have a very small SAD value. Without MB-type and NZ information, motion detection sensitivity is low and/or false alarm rates are high. As with the pixel domain algorithm under frequent lighting condition change environment, both MV and SAD are ill-defined metrics for video analytics application.

In contrast, certain systems constructed according to certain aspects of the invention employ algorithms based on the proposed VAMD 102. MV, NZ, DC information is easily accessible and can be processed to accurately detect a moving object entering into an alarm region. NZ and DC information are useful to overcome light changing conditions, as opposite to pixel domain and MV/SAD only algorithms. a System Description Turning now to FIG. 2, certain embodiments of the invention employ a processing system that includes at least one computing system 20 deployed to perform certain of the steps described above. Computing system 20 may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, communications device and/or graphics processing systems. In one example, computing system 20 comprises a bus 202 and/or other mechanisms for communicating between processors, whether those processors are integral to the computing system 20 (e.g. 204, 205) or located in different, perhaps physically separated computing systems 200. Typically, processor 204 and/or 205 comprises a CISC or RISC computing processor and/or one or more digital signal processors. In some embodiments, processor 204 and/or 205 may be embodied in a custom device and/or may perform as a configurable sequencer. Device drivers 203 may provide output signals used to control internal and external components and to communicate between processors 204 and 205.

Computing system 20 also typically comprises memory 206 that may include one or more of random access memory ("RAM"), static memory, cache, flash memory and any other suitable type of storage device that can be coupled to bus 202. Memory 206 can be used for storing instructions and data that can cause one or more of processors 204 and 205 to perform a desired process. Main memory 206 may be used for storing transient and/or temporary data such as variables and intermediate information generated and/or used during execution of the instructions by processor 204 or 205. Computing system 20 also typically comprises non-volatile storage such as read only memory ("ROM") 208, flash memory, memory cards or the like; non-volatile storage may be connected to the bus 202, but may equally be connected using a high-speed universal serial bus (USB), Firewire or other such bus that is coupled to bus 202. Non-volatile storage can be used for storing configuration, and other information, including instructions executed by processors 204 and/or 205. Non-volatile storage may also include mass storage device 210, such as a magnetic disk, optical disk, flash disk that may be directly or indirectly coupled to bus 202 and used for storing instructions to be executed by processors 204 and/or 205, as well as other information.

In some embodiments, computing system 20 may be communicatively coupled to a display system 212, such as an LCD flat panel display, including touch panel displays, electroluminescent display, plasma display, cathode ray tube or other display device that can be configured and adapted to receive and display information to a user of computing system 20. Typically, device drivers 203 can include a display driver, graphics adapter and/or other modules that maintain a digital representation of a display and convert the digital representation to a signal for driving a display system 212. Display system 212 may also include logic and software to generate a display from a signal provided by system 200. In that regard, display 212 may be provided as a remote terminal or in a session on a different computing system 20. An input device 214 is generally provided locally or through a remote system and typically provides for alphanumeric input as well as cursor control 216 input, such as a mouse, a trackball, etc. It will be appreciated that input and output can be provided to a wireless device such as a PDA, a tablet computer or other system suitable equipped to display the images and provide user input.

In certain embodiments, computing system 20 may be embedded in a system that captures and/or processes images, including video images. In one example, computing system may include a video processor or accelerator 217, which may have its own processor, non-transitory storage and input/output interfaces. In another example, video processor or accelerator 217 may be implemented as a combination of hardware and software operated by the one or more processors 204, 205. In another example, computing system 20 functions as a video encoder, although other functions may be performed by computing system 20. In particular, a video encoder that comprises computing system 20 may be embedded in another device such as a camera, a communications device, a mixing panel, a monitor, a computer peripheral, and so on.

According to one embodiment of the invention, portions of the described invention may be performed by computing system 20. Processor 204 executes one or more sequences of instructions. For example, such instructions may be stored in main memory 206, having been received from a computer-readable medium such as storage device 210. Execution of the sequences of instructions contained in main memory 206 causes processor 204 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 204 and/or 205, particularly where the instructions are to be executed by processor 204 and/or 205 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 204 and 205 or remotely, typically by use of network connection. Non-volatile storage may be removable from computing system 204, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 20. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 204 and/or 205. For example, the instructions may initially be retrieved from a magnetic disk of a remote computer and transmitted over a network or modem to computing system 20. The instructions may optionally be stored in a different storage or a different part of storage prior to or during execution.

Computing system 20 may include a communication interface 218 that provides two-way data communication over a network 220 that can include a local network 222, a wide area network or some combination of the two. For example, an integrated services digital network (ISDN) may used in combination with a local area network (LAN). In another example, a LAN may include a wireless link. Network link 220 typically provides data communication through one or more networks to other data devices. For example, network link 220 may provide a connection through local network 222 to a host computer 224 or to a wide are network such as the Internet 228. Local network 222 and Internet 228 may both use electrical, electromagnetic or optical signals that carry digital data streams.

Computing system 20 can use one or more networks to send messages and data, including program code and other information. In the Internet example, a server 230 might transmit a requested code for an application program through Internet 228 and may receive in response a downloaded application that provides or augments functional modules such as those described in the examples above. The received code may be executed by processor 204 and/or 205.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide video analytics systems and methods. Some of these embodiments comprise a video encoder operable to generate macroblock video analytics metadata (VAMD) from a video frame. Some of these embodiments comprise one or more modules that receive the VAMD and an encoded version of the video frame and configured to generate video analytics information related to the frame using the VAMD and the encoded video frame. In some of these embodiments, the one or more modules extract a global motion vector related to the encoded frame from the VAMD. In some of these embodiments, the one or more modules detect motion of an object within the encoded frame relative to a previous encoded frame. In some of these embodiments, the one or more modules track the object within the encoded frame and subsequent encoded frames.

In some of these embodiments, the one or more modules monitor a line within the encoded frame. In some of these embodiments, the one or more modules count traversals of the line by one or more moving objects observable within a plurality of sequential encoded frames. In some of these embodiments, the one or more modules generate an alarm when a moving object crosses the line in one of a plurality of sequential encoded frames. In some of these embodiments, the line is a physical line observable within the encoded frame. In some of these embodiments, the line is a virtual line identified in the encoded frame. In some of these embodiments, the line is one of a plurality of lines of a polygon that delineates an area observable within the encoded frame.

In some of these embodiments, the VAMD comprises one or more of a non-zero-count, a macroblock type, a motion vector, selected DC/AC coefficients after DCT transform, a sum of absolute value after motion estimation for each macroblock. In some of these embodiments, the VAMD comprises video frame level information including one or more of an A/D motion flag and a block based motion indictor generated in an analog to digital front end.

Certain embodiments of the invention provide video analytics systems and methods. Some of these embodiments comprise generating macroblock video analytics metadata (VAMD) while encoding a plurality of macroblocks in a video frame. Some of these embodiments comprise communicating an encoded version of the frame to a video decoder and at least a portion of the VAMD corresponding to the plurality of macroblocks in the frame. In some of these embodiments, a processor communicatively coupled with the video decoder uses the VAMD to generate video analytics information related to the frame using the VAMD and the encoded video frame.

In some of these embodiments, the video analytics information includes a global motion vector. In some of these embodiments, the processor detects and tracks motion of an object using the video analytics information. In some of these embodiments, the processor detects and monitors traversals of a line identified in the frame by a moving object using the video analytics information. In some of these embodiments, the line is one of a plurality of lines of a polygon that delineates an area observable within the frame.

Certain embodiments of the invention provide video analytics systems and methods. In some of these embodiments, the methods are implemented in one or more processors of a video decoder system configured to execute one or more computer program modules. In some of these embodiments, the method comprises executing, on the one or more processors, one or more program modules configured to cause the decoder to receive an encoded video frame and macroblock video analytics metadata (VAMD) generated during encoding of a plurality of macroblocks in the video frame. In some of these embodiments, the method comprises executing, on the one or more processors, one or more program modules configured to cause the processor to generate video analytics information related to an image decoded from the encoded frame using the VAMD. In some of these embodiments, the video analytics information includes a global motion vector. In some of these embodiments, the processor detects and tracks motion of an object using the video analytics information. In some of these embodiments, the processor detects and monitors traversals of a line identified in the frame by a moving object using the video analytics information.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising
a video encoder that generates macroblock video analytics metadata (VAMD) related to a video frame while the video encoder is compressing the video frame,
wherein a compressed version of the video frame and the VAMD generated during compression of the video frame are concurrently transmitted to one or more decoders or modules operative to generate video analytics information related to the video frame using the VAMD and a decompressed version of the video frame.

2. The apparatus of claim 1, wherein the VAMD comprises video frame level information including one or more of a motion flag and a block based motion indicator generated in an analog to digital front end.

3. The apparatus of claim 1, wherein the VAMD comprises one or more of a count of non-zero coefficients, a macroblock type, a motion vector, selected DC/AC coefficients after discrete cosine transform, or a sum of absolute differences value after motion estimation for each macroblock.

4. The apparatus of claim 1, wherein the VAMD enables the one or more decoders or modules to extract a global motion vector related to the encoded frame.

5. The apparatus of claim 1, wherein the VAMD enables the one or more decoders or modules to detect motion of an object within the encoded frame relative to a previous encoded frame.

6. The apparatus of claim 5, wherein the VAMD enables the one or more decoders or modules to track the object within the encoded frame and subsequent encoded frames.

7. The apparatus of claim 1, wherein the VAMD enables the one or more decoders or modules to monitor a line within the encoded frame.

8. The apparatus of claim 7, wherein the VAMD enables the one or more decoders or modules to count traversals of the line by one or more moving objects observable within a plurality of sequential encoded frames.

9. The apparatus of claim 7, wherein the one or more decoders or modules are configured to generate an alarm when a moving object crosses the line in one of a plurality of sequential encoded frames.

10. The apparatus of claim 7, wherein the line is a physical line observable within the encoded frame.

11. The apparatus of claim 7, wherein the line is a virtual line identified in the encoded frame.

12. The apparatus of claim 9, wherein the line is one of a plurality of lines of a polygon that delineates an area observable within the encoded frame.

13. A video analytics method, comprising:
generating macroblock video analytics metadata (VAMD) at a video encoder while encoding a plurality of macroblocks in a video frame in the video encoder; and
communicating an encoded version of the frame to a video decoder together with at least a portion of the VAMD corresponding to the plurality of macroblocks in the frame,
wherein the VAMD enables the video decoder to generate video analytics information related to the video frame.

14. The method of claim 13, wherein the VAMD includes information related to a global motion vector.

15. The method of claim 13, wherein the VAMD enables the video decoder to detect and track motion of an object in the video frame.

16. The method of claim 13, wherein the VAMD enables the video decoder to detect and monitor traversals of a line identified in the video frame by a moving object.

17. The method of claim 16, wherein the line is one of a plurality of lines of a polygon that delineates an area observable within the frame.

18. A non-transitory computer-readable medium encoded with data and instructions wherein the data and instructions, when executed by a processor of a video decoder system, cause the video decoder system to perform a method comprising:
decoding a plurality of macroblocks from a video stream;
decoding video analytics metadata (VAMD) from the video stream, wherein the VAMD was generated by an encoder while the encoder was encoding the plurality of macroblocks; and
generating video analytics information related to an image encoded in the plurality of macroblocks, using the VAMD.

19. The method of claim 18, wherein the video analytics information includes a global motion vector and, wherein the VAMD comprises information useable for detection and tracking of motion of an object.

20. The method of any of claim 18, wherein the VAMD comprises information that enables the detection of line traversals by a moving object.

* * * * *